United States Patent Office.

GIDEON O. SPENCE, OF TITUSVILLE, PENNSYLVANIA, ASSIGNOR TO HIMSELF, A. R. WILLIAMS, AND J. S. LATHROP, OF SAME PLACE.

Letters Patent No. 78,545, dated June 2, 1868.

IMPROVED PROCESS OF TREATING PETROLEUM FOR THE MANUFACTURE OF LUBRICATING-OILS.

The Schedule referred to in these Letters Patent and making part of the same.

TO ALL WHOM IT MAY CONCERN:

Be it known that I, GIDEON O. SPENCE, of the city of Titusville, county of Crawford, and State of Pennsylvania, have invented a new and improved Method of Treating Crude Petroleum and Coal-Oil, and their Products, in the Manufacture of Lubricating-Oil; and I do hereby declare that the following is a full, clear, and exact description thereof, from which others skilled in the art may be able to make use of the same.

In the manufacture of lubricating-oil by my process, I use, as a base, crude petroleum or coal-oil, or their products, and, in said process, the treatment, so far as relates to the chemicals used and their proportions, depends somewhat upon the gravity of the hydrocarbon used as a base, and also upon that of the manufactured oil.

I will proceed to describe my method of treatment, and, for the sake of convenience, will assume that the residuum of crude petroleum, or result of distillation, is to be used as a base, say of a gravity of 30° Baumé, or thereabouts.

I first run the residuum into a receiver, in which has been placed a quantity of chloride of sodium (or any of the haloid salts) as a solvent, in the proportion of about one pound to each forty gallons. I heat the same to about 150° Fahrenheit, or sufficiently to thoroughly mix the ingredients. I then decant into a second receiver, and add hydrated potassa, (or any alkali of the same or similar chemical and electrical action,) as a solvent, to the amount of about one pound to forty gallons, more or less, as the gravity may be lower or higher. I then add muriate of ammonia, (or any of the equivalent hydro-salts,) as a saponifier, in the proportion of about two pounds to forty gallons, and decant to a third receiver, where I add spirits of turpentine, linseed-oil, or oil of like solvent property, as a solvent and deodorizer, in proportion of about one gallon to three hundred. I also add flour of sulphur, in the proportion of about one pound to forty gallons, to destroy cohesion or tenacity. Sufficient heat should be applied during the process to thoroughly mix the ingredients.

When treated according to the above description, the manufactured oil retains perfect fluidity at a temperature of zero, while lard and other animal lubricating-oils congeal in winter at a temperature of 32°, or above.

For spring, summer, and autumn use, and for use in warm climates, I should ordinarily use only two of the above chemicals, namely, hydrated potassa and muriate of ammonia, or their equivalents, adding one or all of the others above named, as peculiarities of the trade may require.

The proportions of the chemicals given above are by no means arbitrary, as, for instance, the use of double the given quantity of either would probably do no positive harm, while a less quantity would suffice in some instances; but the proportions given are such as I deem sufficient and best in practice. They will depend somewhat upon the gravity of the base used, as well as the gravity and quality required for the manufactured oil, the said proportions being somewhat greater or less, as the gravity of the base may be lower or higher than that assumed, (30°;) but, from the above description, any skilled chemist or manipulator of oils will be enabled to judge of the amount of variation in proportion required in practice.

So far as I know, all manufactured lubricating-oils heretofore made have proved deficient in lubricating-qualities, as compared with lard and other animal oils, while the latter are entirely too costly for many uses. Machinists have given my lubricating-oils (made by each of the above formulæ) a thorough trial, and pronounce them fully equal to the best animal oils, without liability to congeal in the coldest weather; and, at present prices, the cost of my oil will be about one-third that of a good quality of lard-oil.

For the sake of convenience in future reference, and also for reference in my appended claims, I have designated the chemical ingredients used in my process by numbers, and in the order in which they are named above, as follows:

First. Chloride of sodium, or any of the haloid salts. Used as a solvent.

Second. Hydrated potassa, or any alkali of the same or similar chemical and electrical action; also used as a solvent.

Third. Muriate of ammonia, or any one of the hydro-salts. This serves as a saponifier, and renders the oil less combustible.

Fourth. Spirits of turpentine, linseed-oil, or oil of like solvent property. Used as a solvent and deodorizer.

Fifth. Flour of sulphur, to destroy cohesion or tenacity.

Having thus described my method of treatment, what I claim as my invention, and desire to secure by Letters Patent, is—

1. The use of the first chemical ingredient, herein specified, in the manufacture of lubricating-oil from petroleum or coal-oil, or their products, for the purpose specified.

2. The use of the second chemical ingredient, herein specified, in the manufacture of lubricating-oil from petroleum or coal-oil, or their products, for the purpose specified.

3. The use of the third chemical ingredient, herein specified, in the manufacture of lubricating-oil from petroleum or coal-oil, or their products, for the purpose specified.

4. The use of the fourth chemical ingredient, herein specified, in the manufacture of lubricating-oil from petroleum or coal-oil, or their products, for the purpose specified.

5. The use of the fifth chemical ingredient, herein specified, in the manufacture of lubricating-oil from petroleum or coal-oil, or their products, for the purpose specified.

6. The use of the second and third chemical ingredients, herein specified, in combination, in the manufacture of lubricating-oil from petroleum or coal-oil, or their products, substantially as and for the purposes specified.

7. The use of the five chemical ingredients, herein specified, in combination, in the manufacture of lubricating-oil from petroleum or coal-oil, or their products, substantially as and for the purposes specified.

GIDEON O. SPENCE.

Witnesses:
 ANDREW B. HOWLAND,
 J. J. HOLDEN.